US007069108B2

(12) United States Patent
Saarela et al.

(10) Patent No.: US 7,069,108 B2
(45) Date of Patent: Jun. 27, 2006

(54) AUTOMATED ENGRAVING OF A CUSTOMIZED JEWELRY ITEM

(75) Inventors: Timothy D. Saarela, Lakeville, MN (US); Carlos D. Carbonera, St. Paul, MN (US); Michael J. Frisch, St. Louis Park, MN (US); Yuriy Malinin, Burnsville, MN (US)

(73) Assignee: Jostens, Inc., Bloomington, MN (US)

( * ) Notice: Subject to any disclaimer, the term of this patent is extended or adjusted under 35 U.S.C. 154(b) by 424 days.

(21) Appl. No.: 10/315,475

(22) Filed: Dec. 10, 2002

(65) Prior Publication Data

US 2004/0111178 A1 Jun. 10, 2004

(51) Int. Cl.
*G06F 19/00* (2006.01)

(52) U.S. Cl. ........................ 700/193; 700/98; 700/117; 700/118; 700/160

(58) Field of Classification Search ................ 700/193, 700/98, 117, 118, 159, 233, 160, 182, 180; 409/79, 80, 117, 132; 164/4.1
See application file for complete search history.

(56) References Cited

U.S. PATENT DOCUMENTS 5,116,174 A * 5/1992 Fried et al. .................... 409/79
5,569,003 A * 10/1996 Goldman et al. ........... 409/132
5,968,564 A 10/1999 Welsh et al.
6,085,126 A * 7/2000 Mellgren et al. ........... 700/233
6,300,595 B1 10/2001 Williams
6,407,361 B1 6/2002 Williams
6,546,305 B1 * 4/2003 Hruby ........................ 700/117
6,568,455 B1 * 5/2003 Zieverink ................... 164/4.1
6,763,279 B1 * 7/2004 Davis ......................... 700/117
2001/0044668 A1 * 11/2001 Kimbrough et al. ........ 700/118
2002/0128742 A1 * 9/2002 Zieverink ................... 700/159

FOREIGN PATENT DOCUMENTS

WO WO 01/93156 * 12/2001
WO WO 2004/053653 6/2004

* cited by examiner

*Primary Examiner*—Leo Picard
*Assistant Examiner*—Steven R. Garland
(74) *Attorney, Agent, or Firm*—Dorsey & Whitney LLP

(57) ABSTRACT

A method for manufacturing a ring (i.e. class, championship, or affiliation) begins by receiving order data specifying a series of personalization elements, such as the addition of text and icon designs. A geometric model for each personalization item is constructed. To assemble text panels, the operating system provides font geometry for a desired TrueType font. Then a set of splines are created from the font geometry and are then tessellated to generate polyline sets of data, which are then spaced and mapped between two boundary curves. The personalization elements are then projected onto one of the model's 3D surfaces. A set of machining instructions for a milling machine is generated by obtaining a set of machining pattern strategies, generating a set of curves, projecting the toolpath onto the surface of the ring to calculate the 3D toolpath, and rotating it to a desired angle.

34 Claims, 15 Drawing Sheets

CUSTOMIZED RINGS

ENGRAVING WITH ENDMILL CUTTING TOOL

AUTOMATED ENGRAVING WITH TAPERED CUTTING TOOL

AUTOMATED ENGRAVING WORKFLOW

SYSTEM ARCHITECTURE

GENERAL FLOWCHART

CONSTRUCT MODEL FLOWCHART

ASSEMBLE PANELS FLOWCHART

BUILD TOOLPATH FLOWCHART

BUILD 2½D PROFILE TOOLPATH FLOWCHART

BUILD 2½D RASTER TOOLPATH FLOWCHART

BUILD 2½D SKELETON TOOLPATH FLOWCHART

CONVERSION OF CURVES TO 2½D TOOLPATH FOR THE SKELETON STRATEGY
FLOWCHART

CONVERSION OF CURVES TO 2½D TOOLPATH FOR THE PROFILE AND RASTER STRATEGIES
FLOWCHART

AUTOMATED ENGRAVING OF A CUSTOMIZED JEWELRY ITEM

BACKGROUND OF THE INVENTION

The process of the present invention relates to the manufacture of personalized items such as jewelry. More particularly, the process of the present invention relates to an automated system that receives custom orders for personalized rings (i.e., class, championship, and affiliation) and generates the machining instructions that enable a milling machine to create the personalized ring from a wax blank.

Class rings have been a popular keepsake among students for generations. Originally, they were relatively uniform and provided students little opportunity to express themselves. Over time, automated manufacturing processes made it possible to provide students customizing choices. Modern students are driving the class ring market toward a level of customization that has been previously economically impractical using present manufacturing methods.

Present manufacturing methods include the use of computer aided design/computer-aided manufacturing (CAD/CAM). CAD/CAM has facilitated producing customized rings in large quantities. The present level of customization provides personalized features such as: student's name, school name, graduation year, icons, academic degrees, and the like.

Traditionally, the use of CAD/CAM in the jewelry industry has been primarily focused on the manufacture of custom molds and engraving or otherwise machining the jewelry directly. These two approaches have limitations. Machining molds using CAD/CAM is too expensive for single-use custom applications. Engraving jewelry is also expensive due to the precious metal lost to scrap, manufacturing errors and ordering errors.

CAD/CAM technology is also difficult to automate for the purpose of making personalized products. In one legacy system, a CAD/CAM operator manually manipulates a geometric model of a ring by grabbing a surface on the blank geometric model, defining the boundary splines, projecting the text or graphic onto the surface and then instructing the CAD/CAM software to generate machining instructions for the geometric model that has been created. The machining instructions result in a desired toolpath for a computer numerically controlled ("CNC") milling machine. Using human operators to repeat these steps manually in order to generate the machining instructions for thousands of individual, personalized rings is cost prohibitive.

BRIEF SUMMARY OF THE INVENTION

The present invention provides a cost effective solution to the problems discussed above. One aspect of the present invention is directed toward reducing the amount of precious metal lost to scrap. As opposed to personalizing jewelry by machining personalized features directly into the precious metal, work is performed, using CAD/CAM, onto a wax blank. The finished wax replica is then used to produce a mold, into which precious metal is poured to produce the desired product.

Using wax in this manner provides numerous advantages over direct machining. First, wax is much softer than metal. Thus, the need for expensive cutting tools is minimized and the tool life of the cutting tools that are needed is greatly extended. Additionally, smaller, more delicate tools can be used to achieve more intricate artwork than possible using beefier, metal-cutting tools.

The increased level of detail allowed by working with wax facilitates an increased offering of choices to jewelry customers. For example, previous personalization options included individualized alphanumeric features such as names or class years. In previous systems, to support personalized rings having students' names, an insert was machined for each name. Thus, when a student named "Mike" ordered a ring with his name on it, the Mike-insert was retrieved and used to cast the ring. Whenever an order included a new name, a new insert would be created. In recent years, more and more parents have adopted unique names for their children. This has resulted in the need for the creation and storage of many more name inserts. In the present invention, by using wax, more precisely defined tapered cutting tools and TrueType typography technology (available from AGFA-Monotype), students can choose to have their name (whether the common or uncommon) engraved in any of a multitude of digital fonts. The present invention also provides a higher level of definition, which allows more alphanumeric characters to be engraved on a ring than was previously available.

Another advantage of wax is that it is very inexpensive. Using wax not only eliminates much of the scrap metal produced by direct machining of jewelry, if ordering errors or manufacturing errors arise in the wax product, no precious metal is lost due to the error.

Another aspect of the present invention is an automated toolpath-generating program for use in milling the customized ring's wax model. The computer system of the present invention creates a geometric model, from which machining instructions are automatically generated and temporarily stored for each text or icon panel for the ring. These machining instructions support both tapered and cylindrical cutter tools as defined by the APT-7 cutting tool geometry model. Once created, the machining instructions are fed directly to a CNC milling machine that creates the wax model. Thus, the CAD/CAM operator is eliminated from the process, thereby greatly increasing production volume and decreasing production costs.

DETAILED DESCRIPTION OF THE INVENTION

Figure 1A:
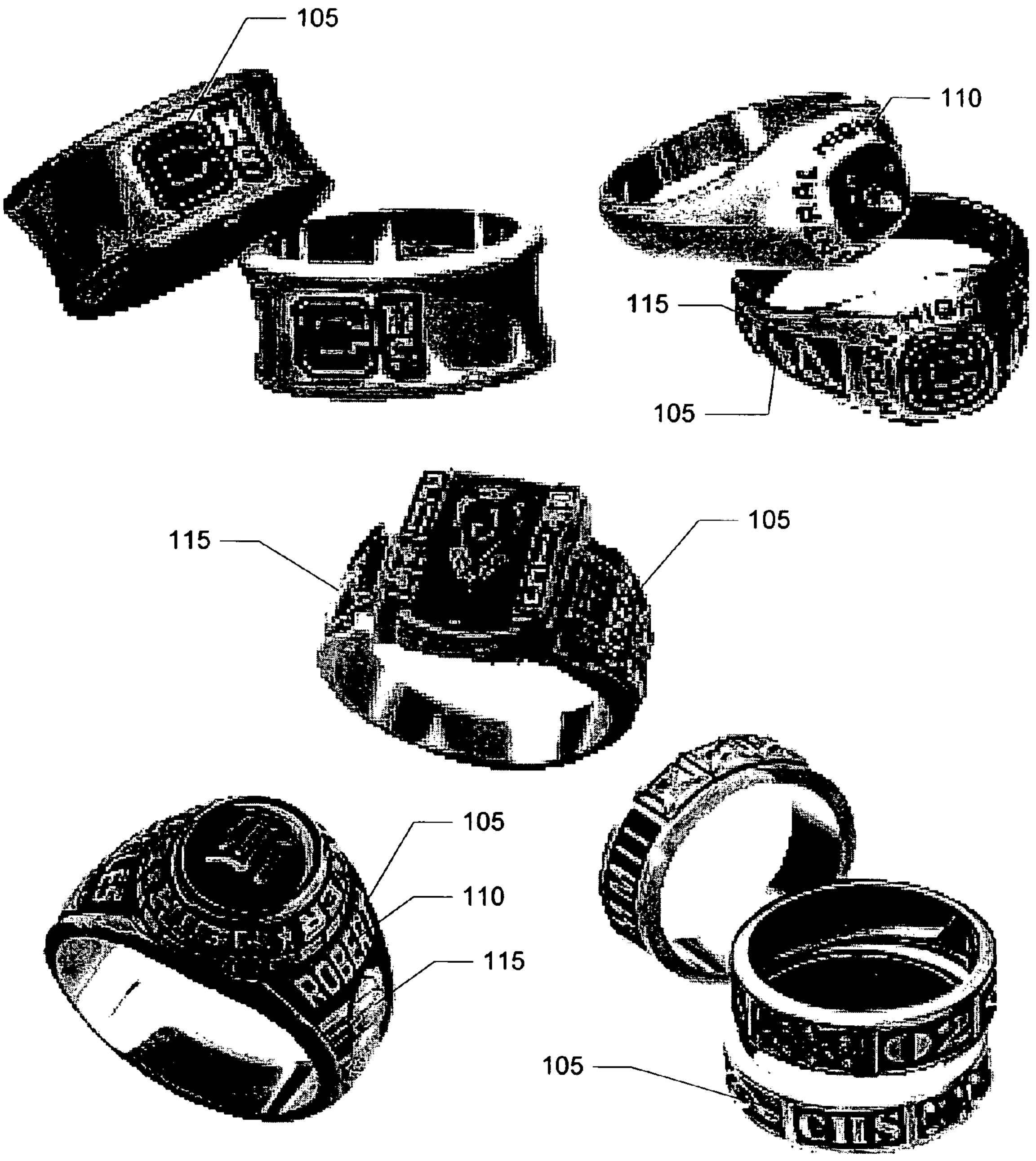
FIGS. 1A through 1C illustrate a sample of customized rings.
Figure 1B:
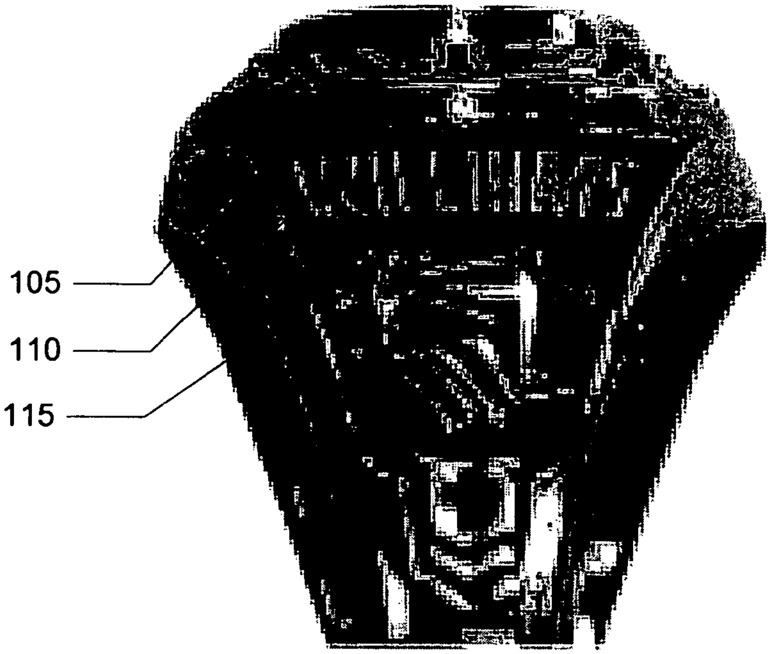
FIG. 1B PRIOR ART
Figure 1C:
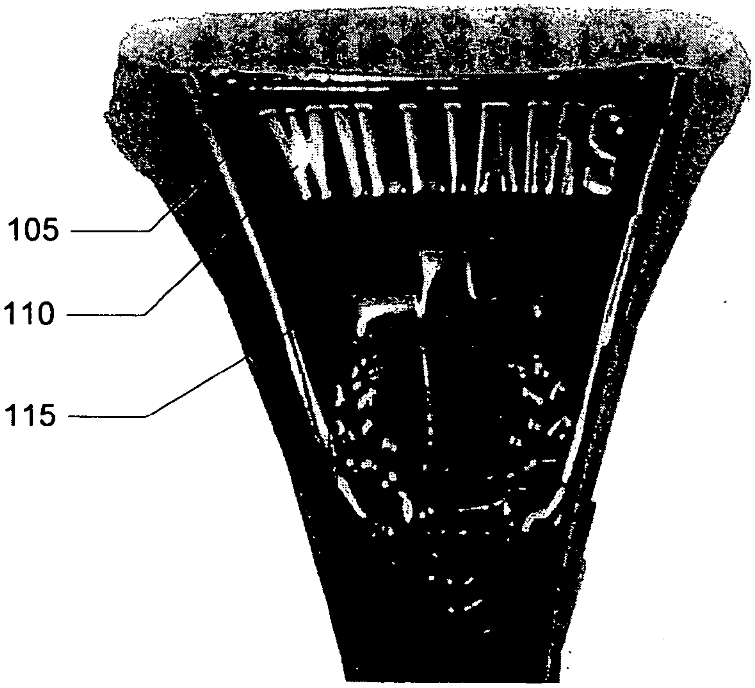

Referring to FIGS. 1A, 1B and 1C, a collection of personalized rings are shown. These rings each have one or more panels 105, which are regions on the ring that can each be personalized by the student purchaser. Each panel 105 can include text 110, a design 115, or both.

Figure 2:
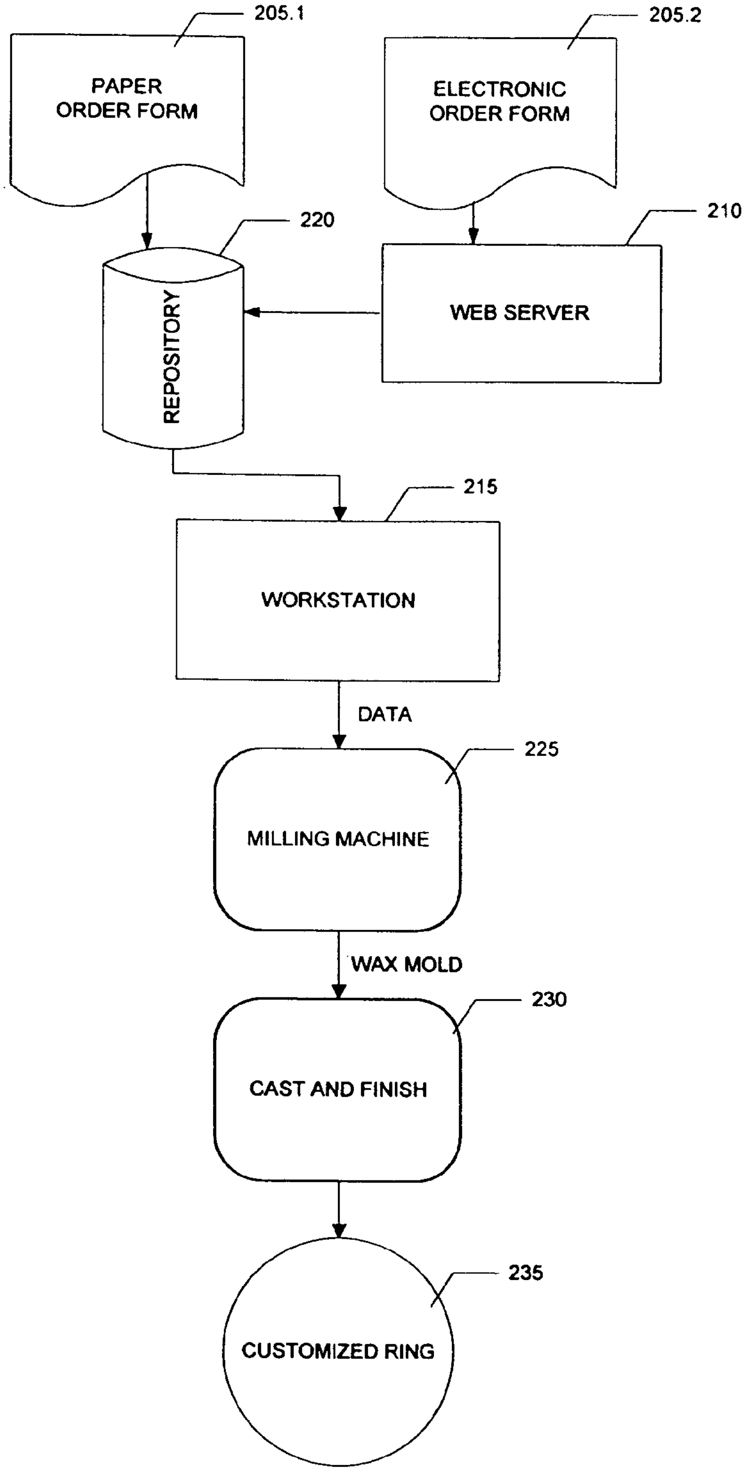
FIG. 2 is a diagram of the workflow followed by the present invention.

FIG. 2 is a workflow diagram illustrating the use of one embodiment of the present invention. As shown in the figure, orders are captured by various channels. For example, student consumers may fill out an on-line electronic order form 205.2 that is submitted to a web server 210 for storage in a database 220. Or, as has been traditionally done, students and their parents may fill out paper-based order forms 205.1 that are turned into a sales representative. Each sales rep may forward a set of order forms to the manufacturer's data entry department, where a group of data entry clerks enter the orders into a computer repository database 220. There are other order channels available, such as by using an IVR (Interactive Voice Response) system with a telephone.

A workstation 215 is managed by a production operator. From this workstation 215, a computer software application can retrieve data for one of the pending orders. The order for a class ring includes all of the personalization to be applied to the ring. For example, the order specifies which type of ring to use, where to engrave the student's name, what font to use, where to place school and year information, where to apply icons representative of the student's interests, etc. The software application applies all of the personalization elements to a 3D virtual model of the ring. Then it translates the model into a series of instructions describing a path that a milling machine's cutting tool follows while machining a ring. This set of instructions are commonly known as the "toolpath". The toolpath is downloaded to a milling machine 225 and a wax blank of the ring is engraved to the specifications ordered by the student. The resulting wax model is then grouped with other wax models and the set of rings are cast and finished 230, resulting in the customized ring 235.

Figure 3:
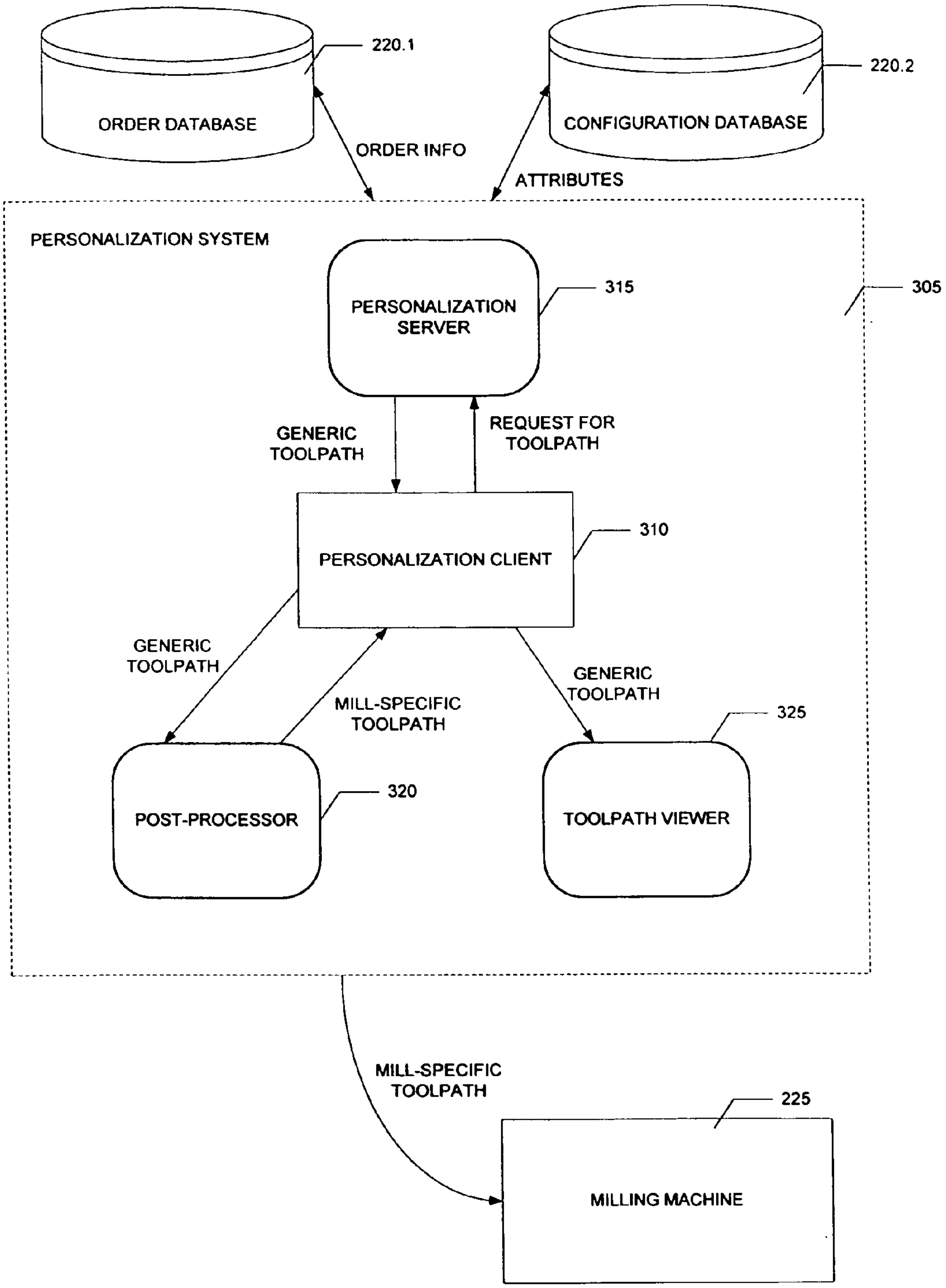
FIG. 3 is the system architecture of one embodiment of the present invention.

FIG. 3 shows they system architecture of one embodiment of the present invention's personalization system 305. A personalization client 310 is a computer program that provides the production operator with a graphical user interface. The personalization client 310 makes requests of a personalization server 315, which in turn performs all of the complex mathematics to generate the toolpath for a milling machine that will result in a ring as ordered by a student. To do so, data may be retrieved from various databases, such as an order database 220.1 and a configuration database 220.2. The personalization client 310 can also provide such functionality as: reading barcodes that represent order IDs, displaying order information, managing queues of orders, and communicating post-processed toolpath to the mills.

A toolpath viewer 325 can be used to provide a preview visualization to the production operator of what will result when the toolpath is applied to the wax blank. In one embodiment, WNCPlot3D viewer software (sold by Intercim) is used as the toolpath viewer 325. The viewer 325 is used mostly in troubleshooting and setup situations.

Once the personalization client 310 and personalization server 315 assemble the generic toolpath (preferably an "ACL" (i.e., Intercim's "ASCII Cutter Location") format file based on the APT (Automatically Programmed Tool) standard), a post-processor 320 (such as Intercim's GPOST post-processor) can be used to translate it to the mill-specific toolpath, which is then downloaded to the milling machine 225.

While the architecture shown in FIG. 2 differentiates the personalization server 315 from the personalization client 310, in some embodiments both reside on the production operator's workstation 215. In other embodiments, the software functionality can be implemented without using a client/server architecture.

Figure 4:
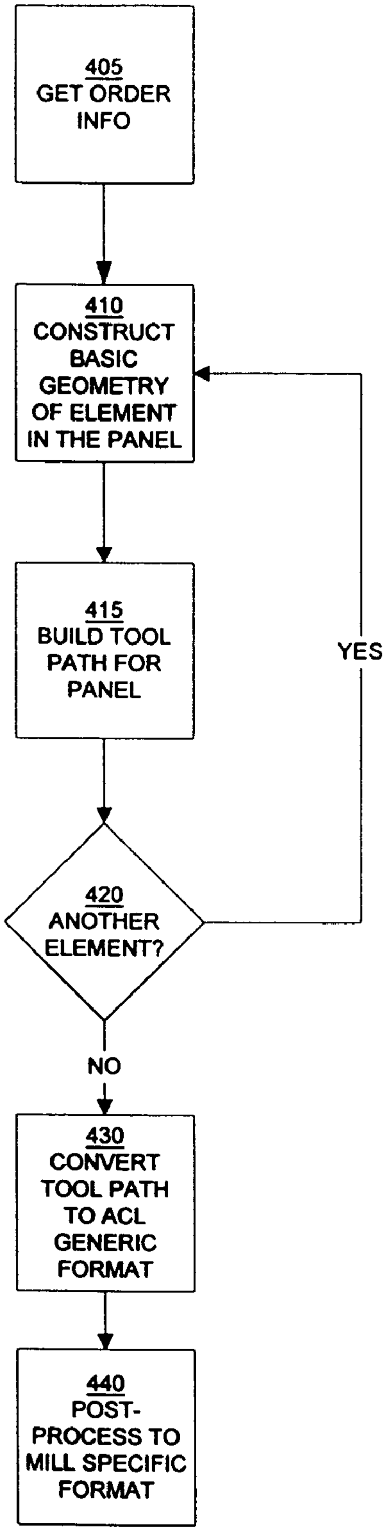
FIGS. 4 through 7 are flowcharts diagramming the steps automated by the present invention.

FIGS. 4 through 7 provide additional details of one embodiment of the processing performed by the personalization server 315 and the personalization client 310. As shown in FIG. 4, the first primary step is to get information for the order to be processed 405. Again, this order information contains information about at least one personalization item to be included in the finished ring. From the order data, the first element to be personalized is processed: the basic geometry for the element is generated 410 and the toolpath is created for the given panel 415 and projected onto the three dimensional surface of the geometric model. The steps of generating geometry and creating toolpath are repeated for each of the remaining personalization elements 420. Once the geometric model shows all of the personalization desired by the student, the toolpath (set of machining instructions) is generated that will create a ring to match the geometric model 430 and 440. Through this process flow, the present invention provides a high level of personalization flexibility, such as the ability to project text and icons onto arbitrary product surfaces.

Figure 5:
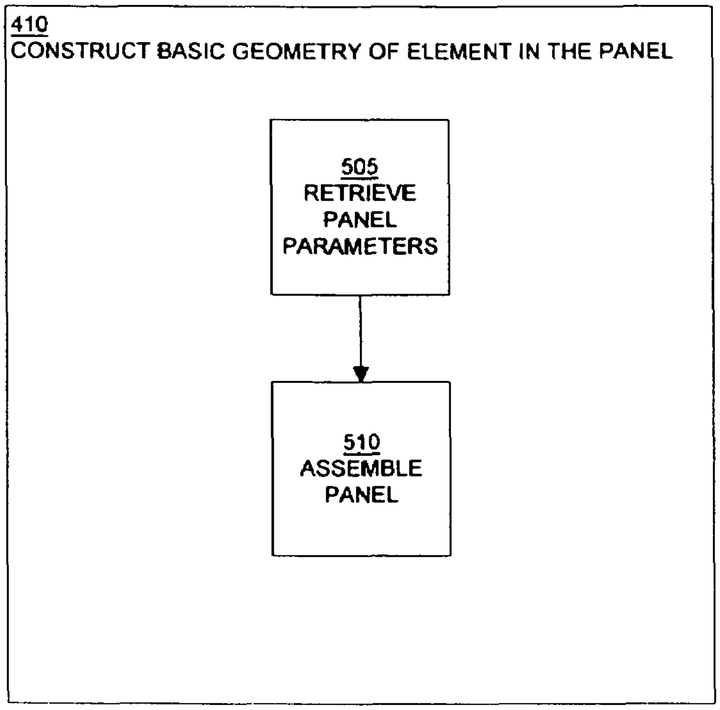
Figure 6:
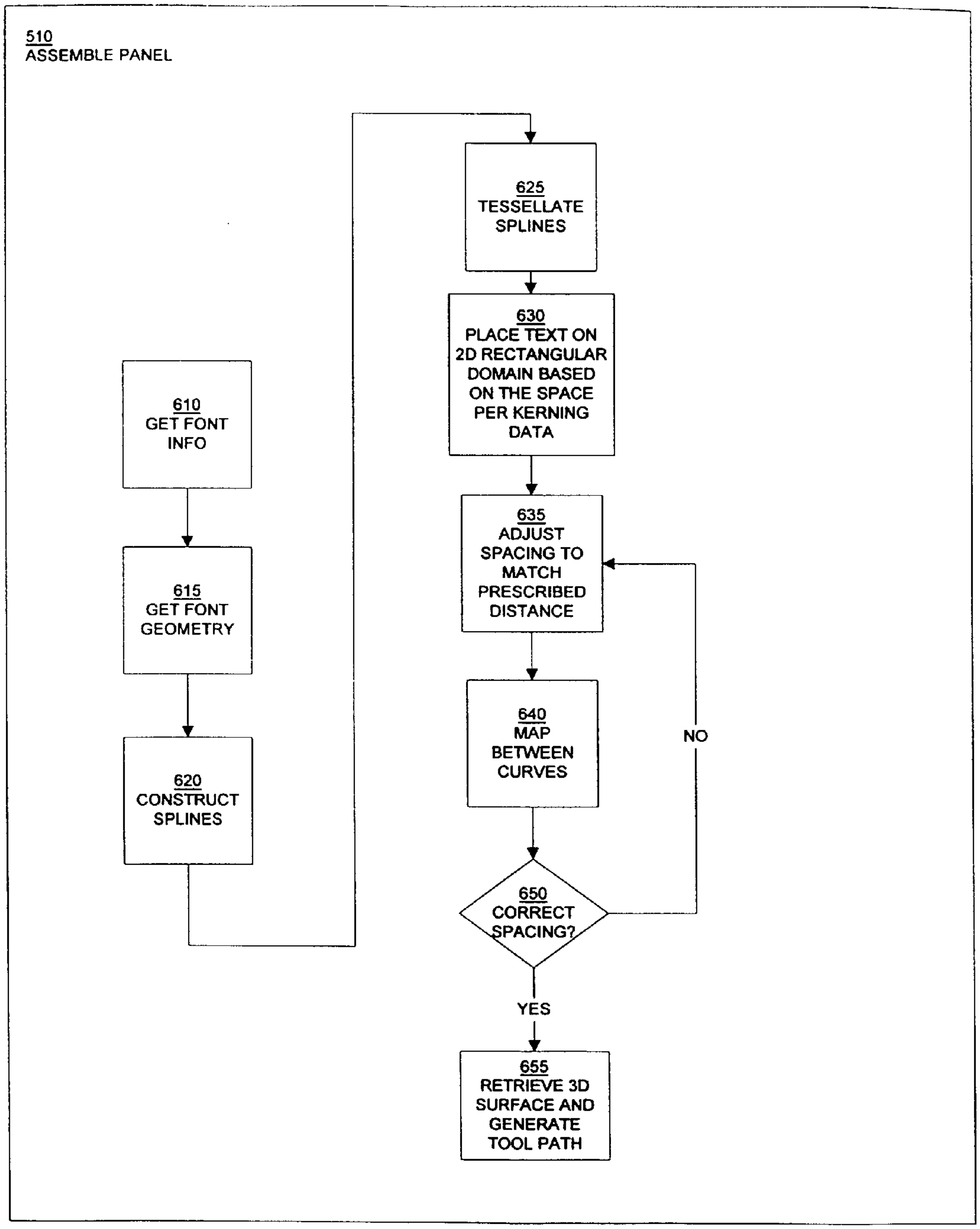

FIG. 5 shows more detail on how the geometric model is created (step 410). The model for each type of ring includes one or more panels, which are the personalization regions for the ring. Thus, each of the panels is retrieved from a repository 505 and then they are assembled together to form the proper geometric model 510. Assembling the text geometry is preceded by retrieving the text requested by the customer as well as a design ID 405. Such a design ID specifies the product being personalized. For example, it specifies which configuration parameters to use (i.e., boundary curves, product surfaces, fonts, and the like). The order data includes an indicator for the desired font to use in personalizing the text. As shown in FIG. 6, this is retrieved 610 and then the operating system is queried for the appropriate font geometry 615. In a preferred embodiment, TrueType brand typographic software is used by the operating system to present the font geometry to the application. In one embodiment, source code from the Microsoft Glyph program can be used to acquire TrueType font geometry from the operating system.

Figure 13:
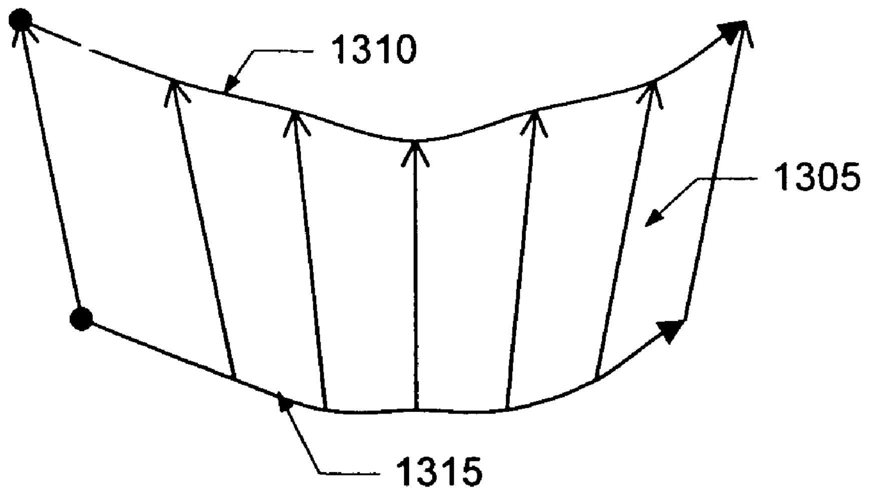
FIG. 13 illustrates mapping a region between boundary curves.

Based on the font geometry, a set of splines are created 620. To construct the splines from the native font geometry, data from the TrueType font information returned by the operating system is used to construct curves in spline format. The text is then mapped between upper and lower boundary curves which define the panel shape in 2 dimensions. This is accomplished with the font geometry information. The first step is to tessellate all of the splines to generate a polyline set for each character of the text 625. The text characters are mapped into a 2D rectangular domain using the kerning information provided with the TrueType font 630. Because kerned type is often more pleasant looking than fixed-spaced type, each of the polyline sets are spaced based on kerning data supplied with the font geometry. The spacing is adjusted to meet the minimum spacing requirements associated with the given panel 635. Once this modification of the text is finished, the polyline sets are mapped between the boundary curves 640 so that the characters or icon curves follow the shape of the two boundaries. To do this, a ruled surface is defined between the two curves. Such a process is discussed in "The NURBS Book" by Les Piegl and Wayne Tiller (pages 337–339) and is illustrated in FIG. 13. In that figure, the ruled surface 1305 is defined between an upper boundary curve 1310 and a lower boundary curve 1315.

Figure 14:
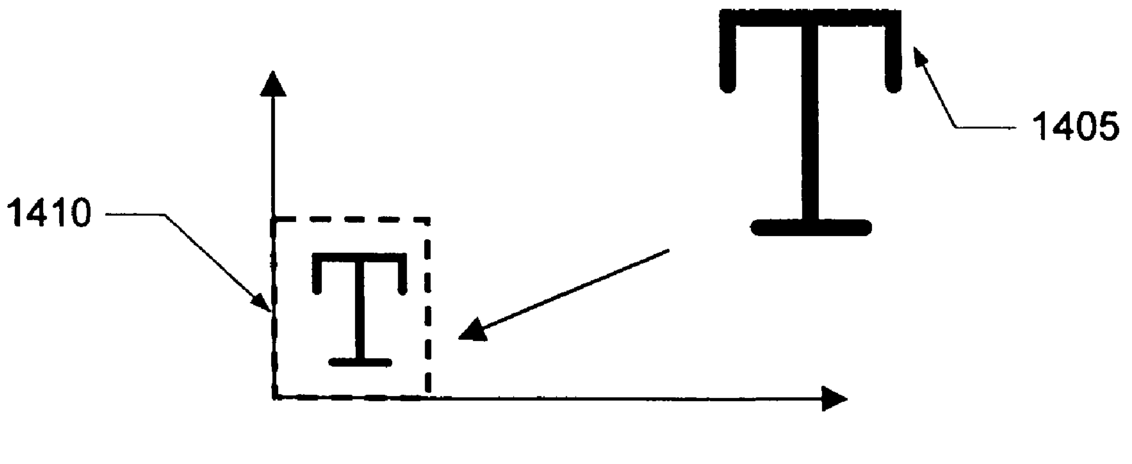
FIG. 14 illustrates scaling a text item to the proper size.

The coordinates of the text or icon curves are scaled to fit into the domain of the newly created ruled surface, and their scaled coordinate values are interpolated using the definition of the ruled surface. FIG. 14 shows a letter "T" 1405 scaled to fit in a domain 1410. The parameterization of the boundary curves will determine the type of mapping. Two basic maps are used in one embodiment: "parallel to ends" and "perpendicular to base." Using a "parallel to ends" technique, the vertical legs of each text character are defined by an interpolation of the slopes of the left and right edges of the boundary shape. Using a "perpendicular to base" technique, the vertical legs of the characters are defined as being perpendicular to the base curve of the boundary shape.

In some embodiments, configuration parameters are retrieved from a repository. The configuration parameters vary for each ring design. Thus, for each ring, the repository may store such data as the font name, character spacing, character thickness, character type (such as raised, incised, etc.), boundary curves, cutter type, and machining pattern.

Figure 7:
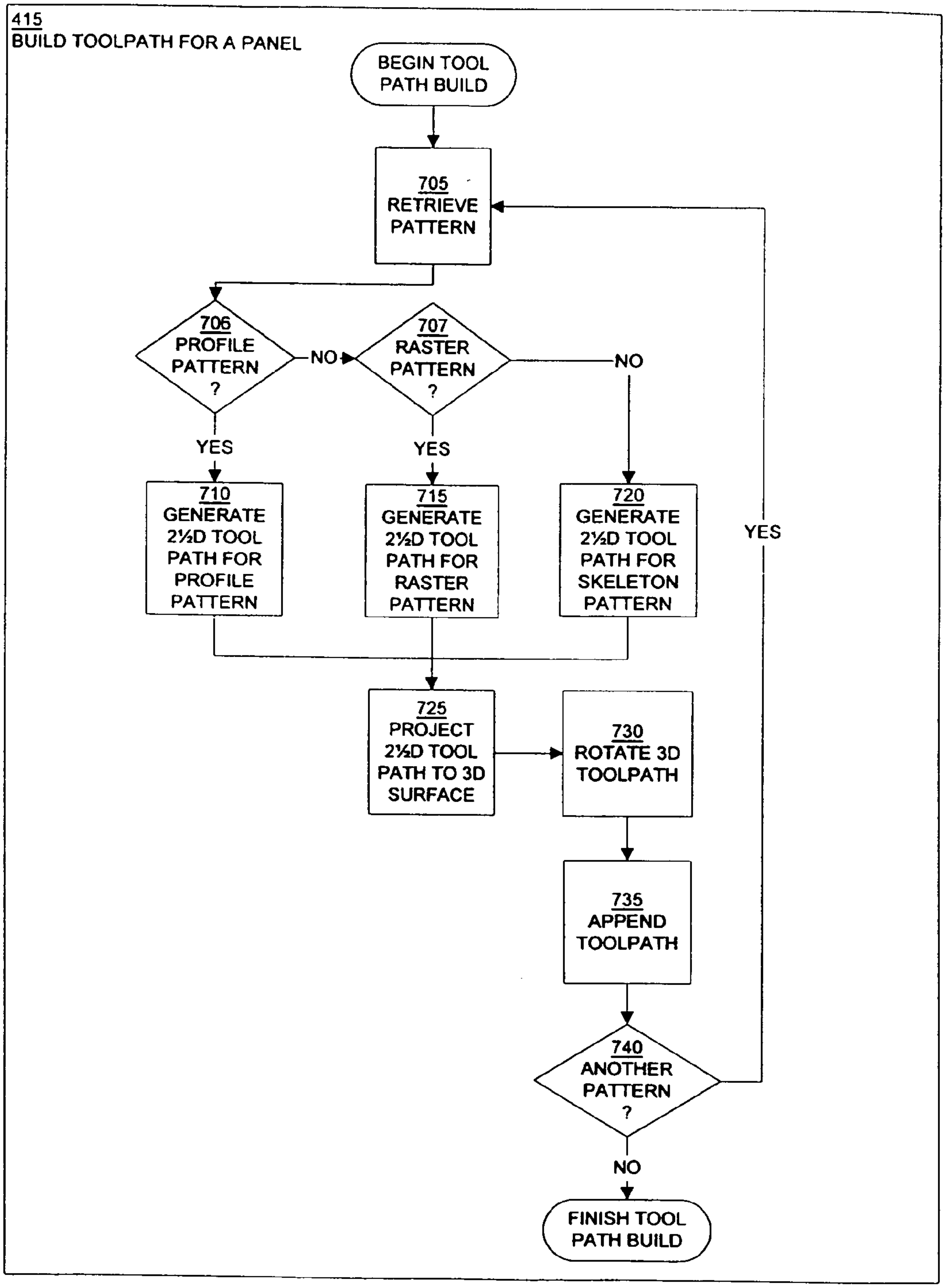

FIG. 7 details how to build the toolpath 415. First, a set of machining patterns and information for the associated cutting tools are retrieved 705. There are several machining patterns (a.k.a. strategies) available for use by the invention. In one embodiment, the following patterns can be used: (a) a raster pattern, wherein Voronoi diagram techniques are used to generate 2D offsets defined by text geometry, cutting tool shape, and cutting depth; (b) a profile pattern, wherein Voronoi diagram techniques are used to generate 2D offsets defined by text geometry, cutting tool shape, and cutting depth; (c) a skeleton pattern, wherein Voronoi diagram techniques are used to generate medial axis transforms defined by text geometry, cutting tool shape, and cutting depth; (d) a light skeleton pattern, wherein Voronoi diagram techniques are used to generate medial axis transforms defined by text geometry, cutting tool shape, and cutting depth; (e) a 2D curve machining with surface projection pattern; and (f) a 3D curve machining pattern. Other machining patterns can be implemented in various embodiments of the invention.

Figure 15:
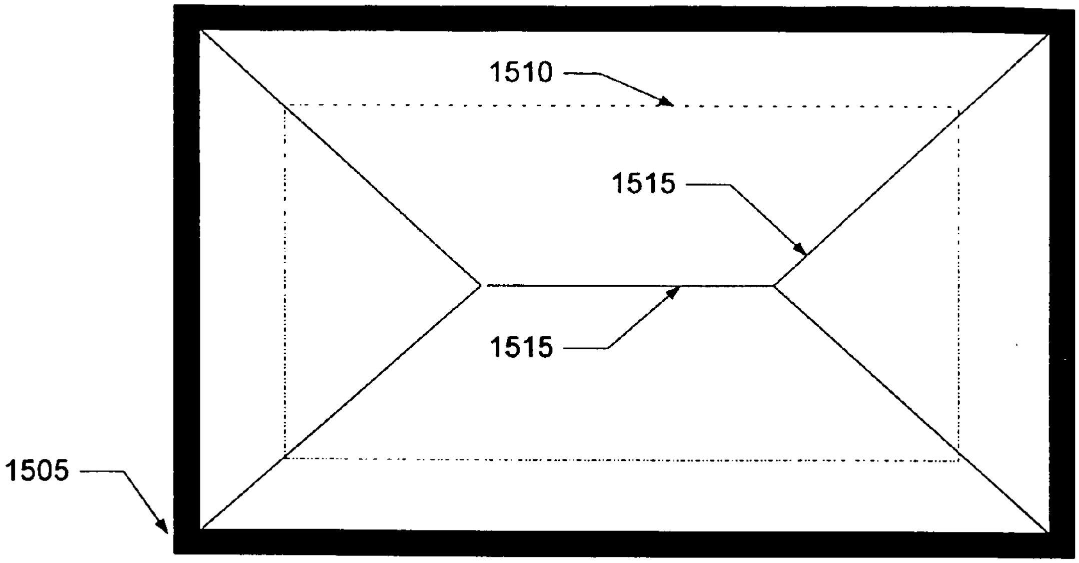
FIGS. 15 and 16 illustrate Voronoi diagrams for full and light skeleton patterns.
Figure 16:
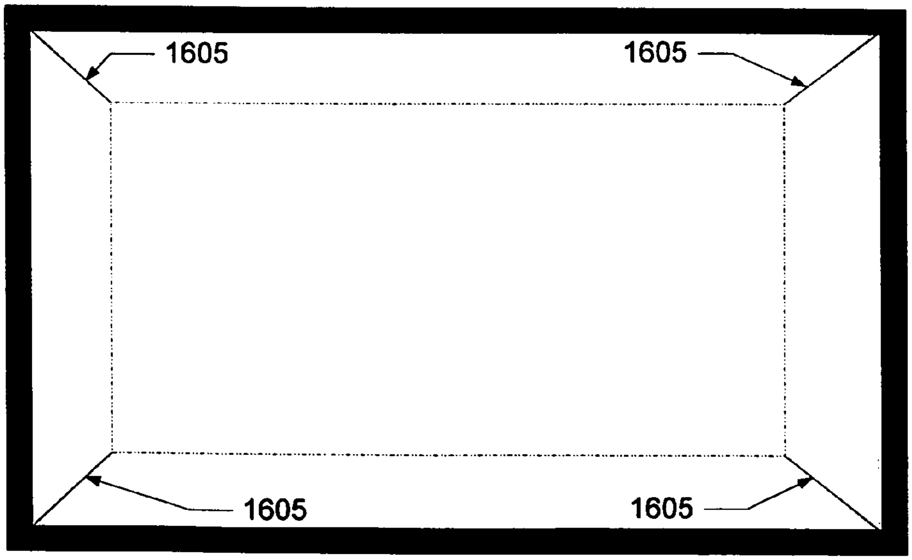

With respect to the light skeleton pattern, it may be generated by constructing the Voronoi diagram of the set of input curves and extracting a subset of the Voronoi diagram that is sometimes referred to as a symmetric axis transform. A z-depth is assigned to each point of the subset of the Voronoi diagram, based on the distance from the point to the two curves associated to the point and the shape of the cutting tool. By combining this light skeleton pattern with the profile pattern, the result is the skeleton pattern. For the 2D curve pattern, the invention projects the curves vertically onto a surface. FIGS. 15 and 16 illustrate the construction of the Voronoi diagram to construct the light skeleton pattern. As shown in the figures, within the pattern there is a geometry that needs to be preserved 1505. Within this preserved area, the maximum distance from the curves to the tool at a given depth is shown 1510. In connection with these, the Voronoi diagram 1515 and the light skeleton pattern 1605 are determined. In one preferred embodiment, the VRONI software library provided by SUNY at Stony Brook (Dr. Martin Held) is used to compute the Voronoi diagrams used by the various machining patterns.

In one embodiment, the geometry being machined is approximated by 2½-dimensional geometry. That is, it is assumed that the objects are two dimensional with a nearly constant z-height. This assumption is valid for many of the ring manufacturing designs. Thus (referring back to FIG. 7), once the machining patterns are retrieved 705, the 2½-dimensional toolpath is generated by retrieving the type of pattern specified. If the pattern requested is "profile" 706, the 2½-dimensional toolpath for the profile pattern is generated 710. If the pattern requested is "raster" 707, the 2½-dimensional toolpath for the raster pattern is generated 715. Otherwise, a full or light skeleton toolpath is generated 720. The toolpath generated for the personalization element is (in one embodiment) either a simultaneous 4-axis toolpath or a positional 4-axis toolpath. In the simultaneous version, the rotational axis is moving from one tool location to another continuously while in the positional version, the tool will remain at a constant rotational axis position, changing only from one panel to the other.

Figure 8:
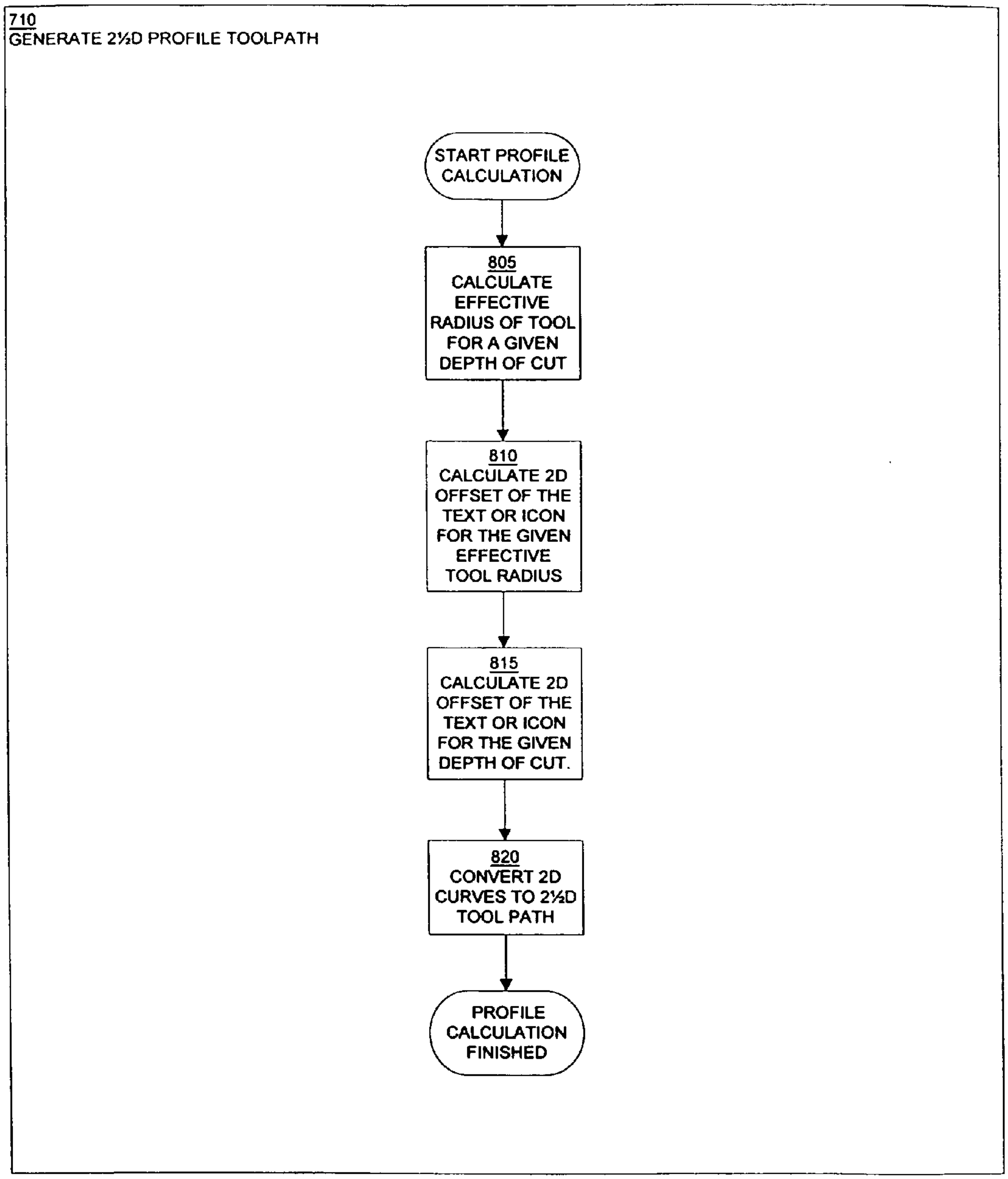
FIGS. 8 through 10 are flowcharts illustrating the steps involved in building the 2½-dimensional toolpath for some of the various available machining strategies.
Figure 9:
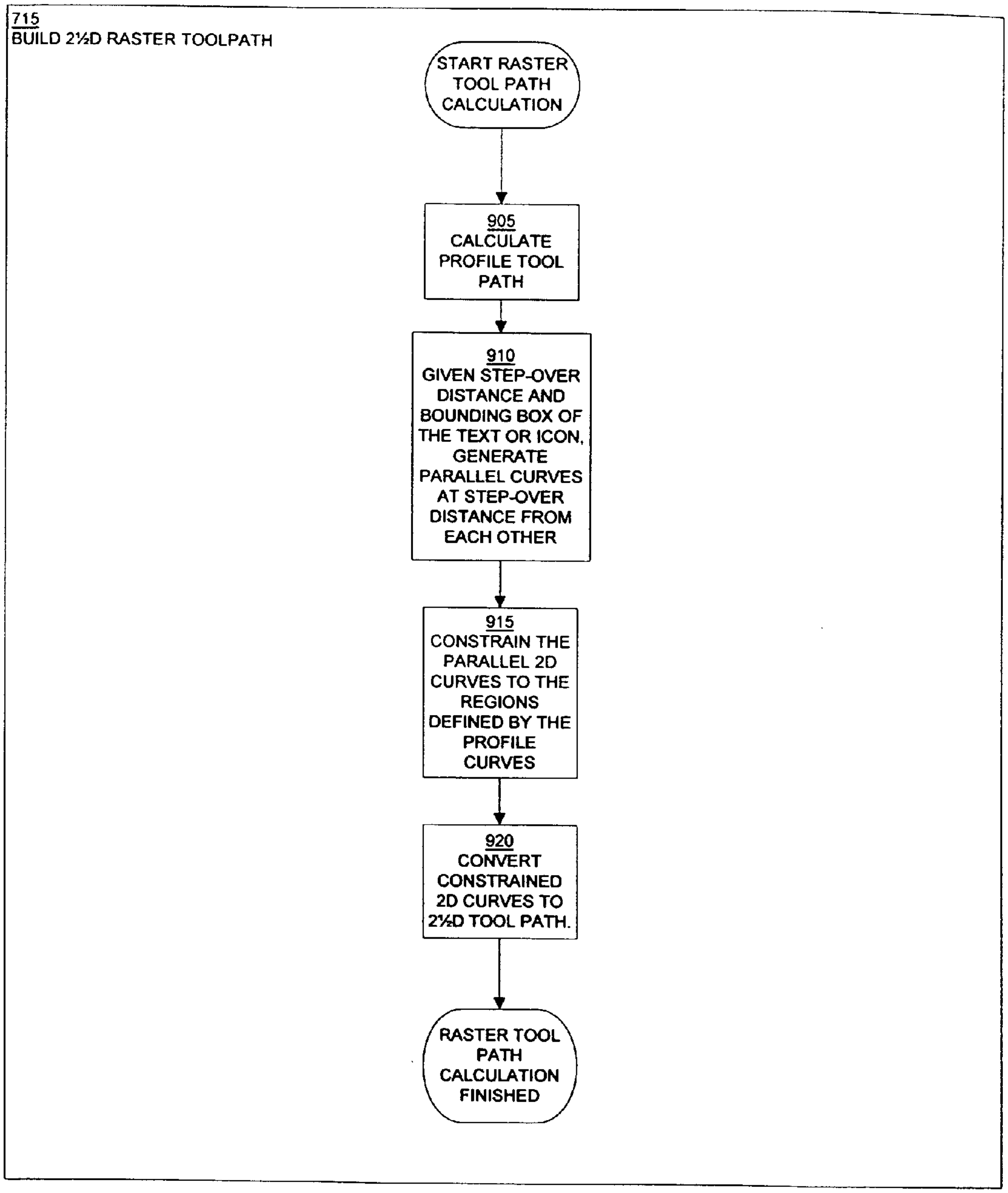
Figure 10:
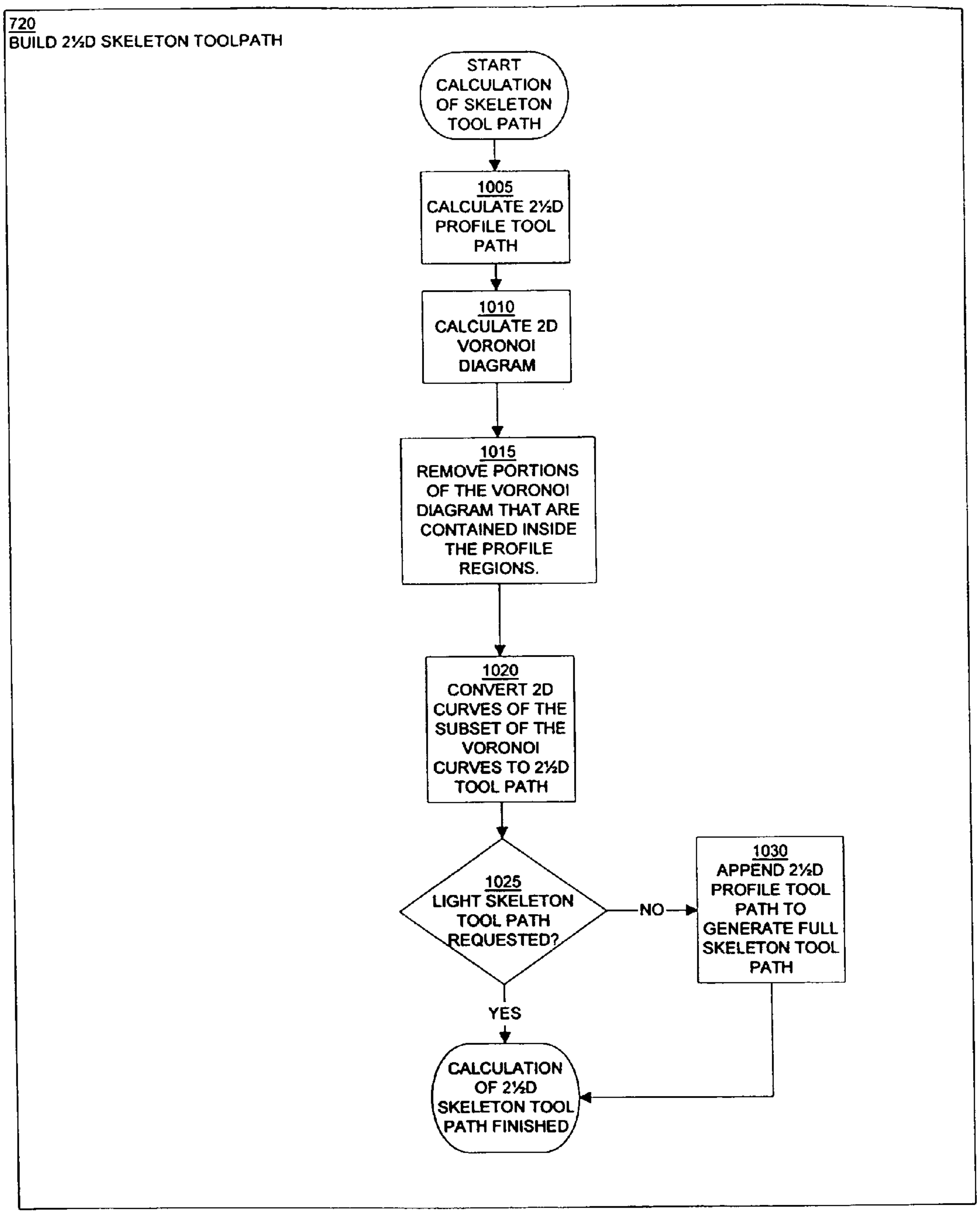

FIGS. 8 through 10 illustrate flowcharts of how to build the 2½-dimensional toolpath is referenced in steps 706 through 720 by one embodiment of the invention. In FIG. 8, this process is shown when using a profile machining pattern. FIG. 9 shows the steps for a raster machining pattern. FIG. 10 shows the steps for a skeleton machining pattern.

Referring now to FIG. 8, when using a profile machining pattern, the effective radius of the cutting tool for a cut having a given depth is first calculated 805. Then the two dimensional offset of the text or icon for that effective cutting tool radius is calculated 810. This is followed by calculating the two dimensional offset of the text or icon for the given depth of cut 815. Finally, the two dimensional curves are converted to 2½-dimensional toolpath 820. (For further detail of this step, refer to FIG. 12.)

As shown in FIG. 9, when using a raster machining pattern, the first step is to calculate the profile toolpath 905. Then, for a given step-over distance and a given bounding box for the text or icon, the present invention generates parallel curves at step-over distance from each other 910. This process is followed by constraining the parallel two dimensional curves to the regions defined by the profile curves 915. Finally, the constrained two dimensional curves are converted to 2½-dimensional toolpath 920. (For further detail of this step, refer to FIG. 12.)

As discussed above, the light skeleton and full skeleton patterns are related. Referring to FIG. 10, when using one of the skeleton machining patterns, the first step is to calculate the 2½-dimensional profile toolpath 1005. Then, the 2D Voronoi diagram is calculated 1010. The present invention then removes portions of the Voronoi diagram that are contained inside the profile regions 1015. Then the 2 dimensional curves of the subset of the Voronoi curves are converted to 2½-dimensional toolpath 1020. (For further detail of this step, refer to FIG. 11.) If the system is using the light skeleton pattern, then the toolpath is finished 1025. Otherwise, if the system is using the full skeleton pattern, then the 2½-dimensional profile toolpath is appended in order to generate the full skeleton toolpath 1030.

Now referring back to FIG. 7, the step of generating the 2½-dimensional toolpath has been detailed above. At the next step of the process shown in FIG. 7, the toolpath is projected onto the surface of the ring 725. This generates the corresponding three-dimensional toolpath. Once the projection is accomplished, the toolpath is rotated by a specified angle to achieve the final toolpath for that particular personalization panel 730.

In the same fashion, all of the remaining personalization panels are processed 740, and the resulting toolpath is concatenated for each iteration 735. In one embodiment of the invention, up to ten personalization items can be handled, meaning that up to ten separate toolpaths are generated and concatenated into a single, master toolpath file. After all panels are processed, the toolpath is converted to the generic ACL format 430. In one embodiment, this conversion is accomplished by a post-processor, such as the Intercim GPOST software product 440.

Figure 11:
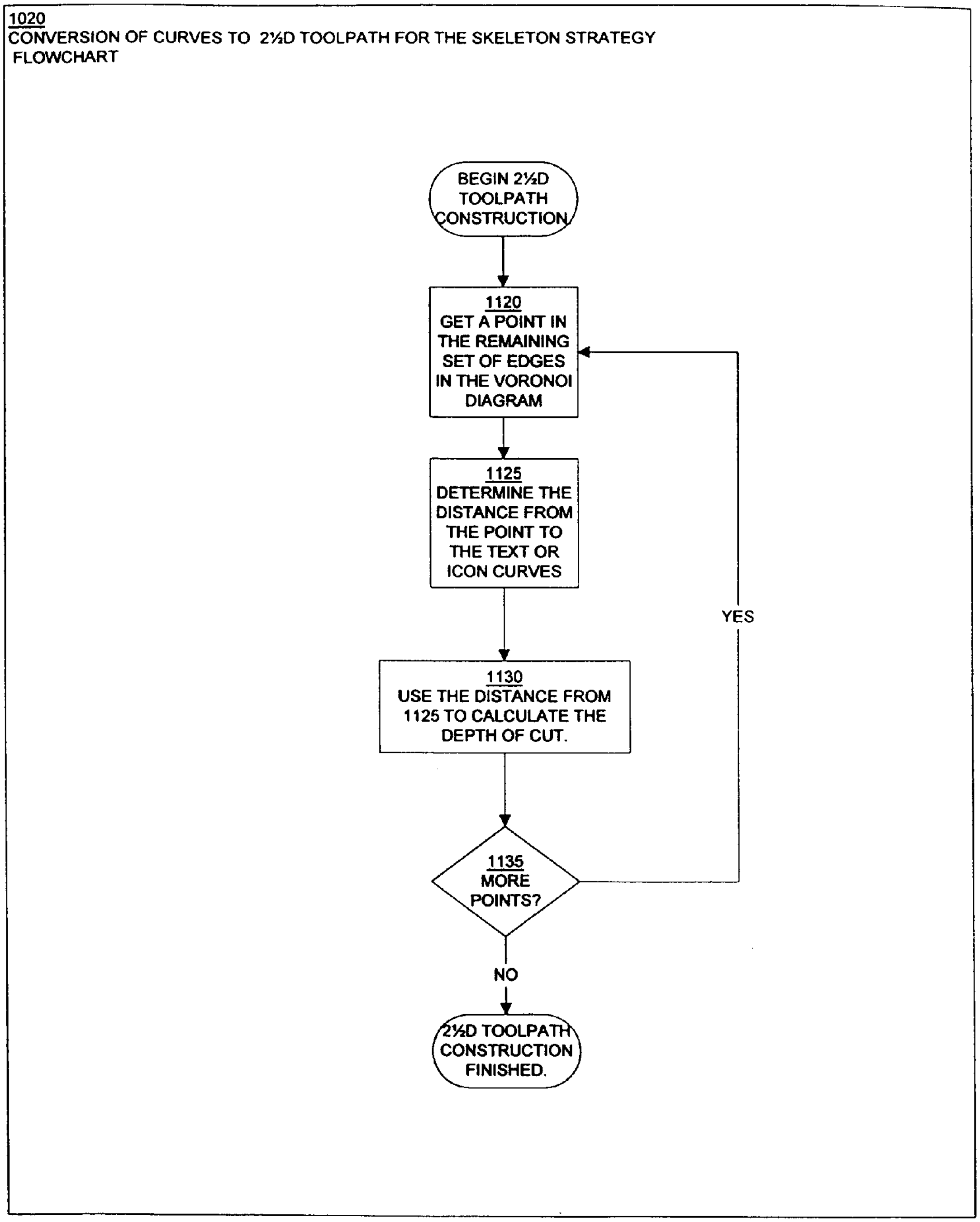
FIGS. 11 and 12 are flowcharts diagramming the steps involved in converting the curves to 2½-dimensional toolpath for three of the available machining strategies.
Figure 12:
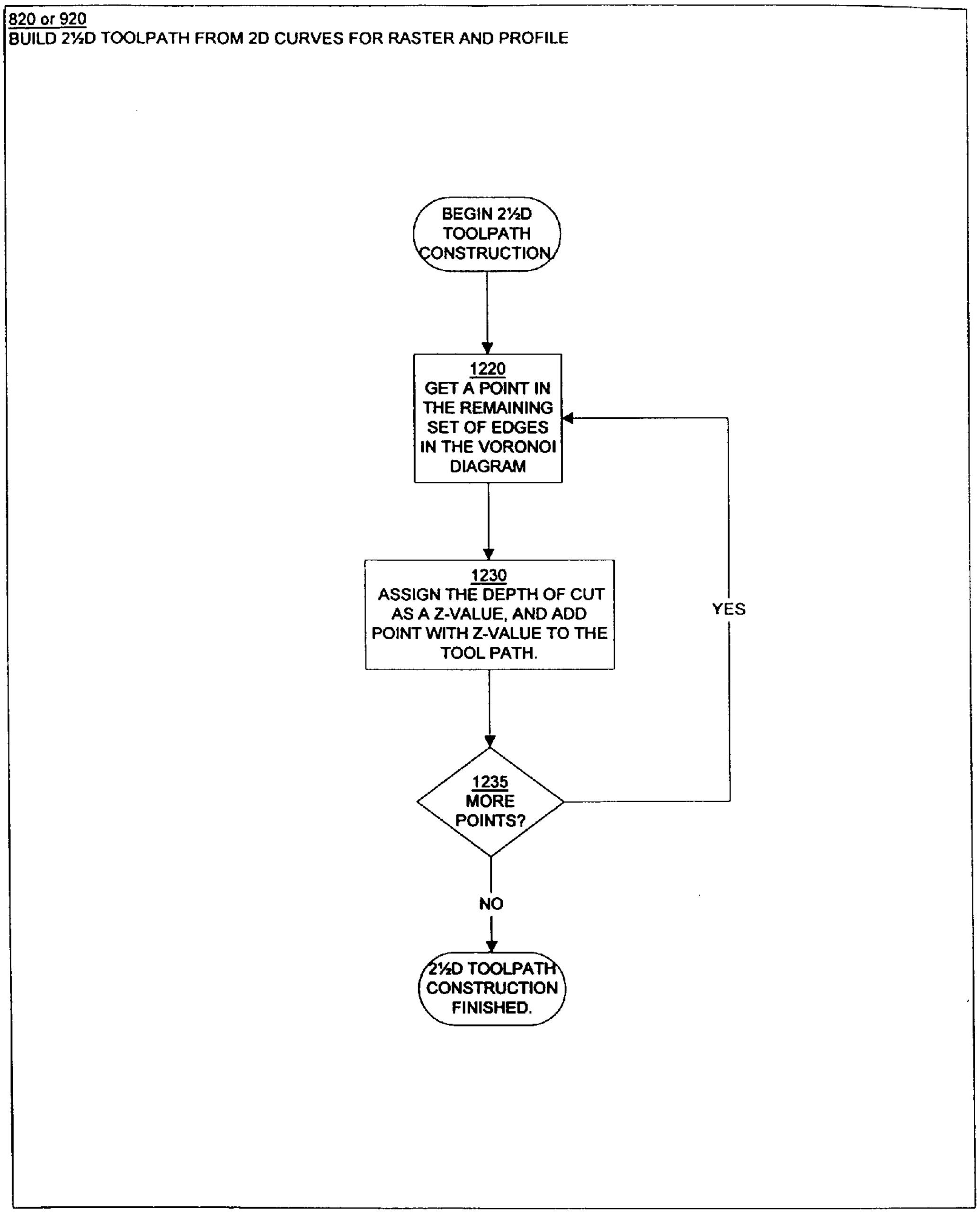

FIGS. 11 and 12 show details of how to convert the curves to 2½-dimensional toolpath for the skeleton, profile, and raster machining patterns. In FIG. 11, for the skeleton strategy pattern, the present invention gets a point in the remaining set of edges from the Voronoi diagram 1120. The distance from that point to the text or icon curves is determined 1125. Next, the depth that corresponds to an effective radius equal to the calculated distance is assigned as a z-value. The point with z-value is added to the toolpath 1130. This repeats for additional points 1135.

In FIG. 12, for profile and raster strategy patterns, the present invention first gets a point in the remaining set of edges in the Voronoi diagram 1220. Then the depth of cut is assigned as a z-value and the point is added with that z-value to the toolpath 1230. This repeats for additional points 1235.

The foregoing description addresses embodiments encompassing the principles of the present invention. The embodiments may be changed, modified and/or implemented using various types of arrangements. Those skilled in the art will readily recognize various modifications and changes that may be made to the invention without strictly following the exemplary embodiments and applications illustrated and described herein, and without departing from the scope of the invention, which is set forth in the following claims.

What is claimed is:

1. A method for manufacturing a customized item, comprising:

receiving order data, where the order data specifies a first personalization element;

constructing a geometric model for the customized item, wherein constructing a geometric model comprises at least one of:

retrieving one or more stock or icon panels from a repository; and assembling one or more text panels for a personalization text in a specified font;

scaling the first personalization element to proper size;

projecting the first personalization element onto a three dimensional surface of the geometric model; and converting the geometric model into a set of machinery instructions for a milling machine compensating for cutter geometry.

2. The method for manufacturing a customized item from claim 1, wherein the order data specifies a second personalization element, and further comprising repeating the steps of scaling and projecting for the second personalization element.

3. The method for manufacturing a customized item from claim 1, wherein the order data is stored in a database.

4. The method for manufacturing a customized item from claim 1, wherein the step of assembling one or more text panels comprises:

retrieving the personalization text and a design number from the order data;

receiving font information for the specified font;

requesting and receiving font geometry from an operating system;

constructing a plurality of splines from the font geometry;

mapping the personalization text onto a two dimensional frame using the font geometry;

tessellating the plurality of splines for generating a polyline data representation, wherein the polyline data representation comprises a plurality of polyline sets, wherein each of the polyline sets describes a character of the personalization text;

processing each of the polyline sets based on kerning data for properly spacing each character of the personalization text; and mapping the polyline data representation between two boundary curves.

5. The method for manufacturing a customized item from claim 4, wherein the step of mapping the personalization text further comprises obtaining a set of configuration parameters from a database.

6. The method for manufacturing a customized item from claim 5, wherein the set of configuration parameters comprise:

a font name parameter, a character spacing parameter, a character thickness parameter, a character type parameter, an upper boundary curve parameter, and a lower boundary curve parameter.

7. The method for manufacturing a customized item from claim 1, wherein the step of converting the geometric model into a set of machining instructions comprises:

obtaining a plurality of machining patterns and associated cutting tools;

generating a first set of curves that define a first two dimensional toolpath based on cutter geometry for a first machining pattern from the plurality of machining patterns;

projecting the first two dimensional toolpath onto a surface of the customized item to generate a first three dimensional toolpath;

repeating steps of generating, projecting and rotating for a second machining pattern from the plurality of machining patterns to obtain a second resulting toolpath;

appending the second resulting toolpath to the first resulting toolpath to generate a master toolpath; and converting coordinates from the master toolpath to a generic format file.

8. The method for manufacturing a customized item from claim 7, wherein the machining pattern is chosen from the group comprising:

a raster pattern, wherein Voronoi diagram techniques are used to generate two dimensional offsets defined by text geometry, cutting tool shape, and cutting depth;

a profile pattern, wherein Voronoi diagram techniques are used to generate two dimensional offsets defined by text geometry, cutting tool shape, and cutting depth;

a skeleton pattern, wherein Voronoi diagram techniques are used to generate medial axis transforms defined by text geometry, cutting tool shape, and cutting depth;

a two dimensional curve machining with surface projection pattern; and a three dimensional curve machining pattern.

9. The method for manufacturing a customized item from claim 7, further comprising reformatting the generic format file to a mill-specific file format.

10. The method for manufacturing a customized item from claim 1, wherein the steps of constructing, scaling, projecting and converting are done on demand when new order data is received.

11. The method for manufacturing a customized item from claim 1, wherein the cutter geometry is tapered or cylindrical.

12. A system for manufacturing a customized item, comprising:

an order module that receives order data, where the order data specifies a first personalization element;

a construction module that constructs a geometric model for the customized item, wherein the construction module comprises at least one of:

a panel retrieval module that retrieves one or more stock or icon panels from a repository; and a panel assembly module that assembles one or more text panels for a personalization text in a specified font;

a scaling module that scales the first personalization element to proper size;

a projection module that projects the first personalization element onto a three dimensional surface of the geometric model; and a conversion module that converts the geometric model into a set of machining instructions for a milling machine compensating for cutter geometry.

13. The system for manufacturing a customized item from claim 12, wherein the order data specifies a second personalization element, and further comprising using the scaling module and the projection module for the second personalization element.

14. The system for manufacturing a customized item from claim 12, further comprising a database, wherein the order data is stored in the database.

15. The system for manufacturing a customized item from claim 12, wherein the panel assembly module comprises:

a text retrieval module that retrieves the personalization text and a design number from the order data;

a font information module that received font information for the specified font;

a font geometry module that requests and receives font geometry from a an operating system;

a spline construction module that constructs a plurality of splines from the font geometry;

a frame mapping module that maps the personalization text onto a two dimensional frame using the font geometry;

a tessellating module that tessellates the plurality of splines for generating a polyline data representation, wherein the polyline data representation comprises a plurality of polyline sets, wherein each of the polyline sets describes a character of the personalization text;

a polyline processing module that processes each of the polyline sets based on kerning data for properly spacing each character of the personalization text; and a polyline mapping module that maps the polyline data representation between two boundary curves.

16. The system for manufacturing a customized item from claim 15, wherein the frame mapping module further comprises a configuration retrieval module that obtains a set of configuration parameters from a database.

17. The system for manufacturing a customized item from claim 16, wherein the set of configuration parameters comprise:

a font name parameter, a character spacing parameter, a character thickness parameter, a character type parameter, an upper boundary curve parameter, and a lower boundary curve parameter.

18. The system for manufacturing a customized item from claim 12, wherein the conversion module comprises:

a pattern retrieval module that obtains a plurality of machining patterns and associated cutting tools;

a curve generation module that generates a first set of curves that define a first two dimensional toolpath based on cutter geometry for a first machining pattern from the plurality of machining patterns;

a toolpath projection module that projects the first two dimensional toolpath onto a surface of the customized item to generate a first three dimensional toolpath;

a toolpath rotation module that rotates the first three dimensional toolpath by a first angle associated with the surface of the customized item to obtain a first resulting toolpath;

a second toolpath creation module that leverages the curve generation module, the toolpath projection module, and the toolpath rotation module for a second machining pattern from the plurality of machining patterns to obtain a second resulting toolpath;

an master toolpath creation module that appends the second resulting toolpath to the first resulting toolpath to generate a master toolpath; and a generic toolpath creation module that converts coordinates from the master toolpath to a generic format file.

19. The system for manufacturing a customized item from claim 18, wherein the machining pattern is chosen from the group comprising:

a raster pattern, wherein Voronoi diagram techniques are used to generate two dimensional offsets defined by text geometry, cutting tool shape, and cutting depth;

a profile pattern, wherein Voronoi diagram techniques are used to generated two dimensional offsets defined by text geometry, cutting tool shape, and cutting depth;

a skeleton pattern, wherein Voronoi diagram techniques are used to generate medial axis transforms defined by text geometry, cutting tool shape, and cutting depth;

a two dimensional curve machining with surface projection pattern; and a three dimensional curve machining pattern.

20. The system for manufacturing a customized item from claim 18, further comprising a file generation module that reformats the generic format file to a mill-specific file format.

21. The system fro manufacturing a customized item from claim 18, wherein the a construction module, the scaling module, the projection module, and the conversion module are executed on demand when new order data is received.

22. The system for manufacturing a customized item from claim 12, wherein the cutter geometry is tapered or cylindrical.

23. A computer program embodied on a computer readable medium, when executed by a computer configures the computer to manufacture a customized item, the computer program comprising:

a code segment for receiving order data, where the order data specifies a first personalization element;

a code segment for constructing a geometric model for the customized item, wherein the code segment for constructing a geometric model comprises at least one of:

a code segment for retrieving one or more stock or icon panels from a repository; and a code segment for assembling one or more text panels for a personalization text in a specified font;

a code segment for scaling the first personalization element onto a three dimensional surface of the geometric model; and a code segment for converting the geometric model into a set of machining instructions for a milling machine compensating for cutter geometry.

24. The computer program for manufacturing a customized item from claim 23, wherein the order data specifies personalization element, and further comprising using the code segment for scaling and the code segment for projecting to process the second personalization element.

25. The computer program for manufacturing a customized item from claim 23, wherein the order data is stored in a database.

26. The computer program for manufacturing a customized item from claim 23, wherein the code segment for assembling one or more text panels comprises:

a code segment for retrieving the personalization text and a design number from the order data;

a code segment for receiving font information for the specified font;

a code segment for requesting and receiving font geometry from an operating system;

a code segment for mapping the personalization text onto a two dimensional frame using the font geometry;

a code segment for tessellating the plurality of splines for generating a polyline data representation, wherein the polyline data representation comprises a plurality of polyline sets, wherein each of the polyline sets based on kerning data for properly spacing each character of personalization text; and a code segment for mapping the polyline text representation between two boundary curves.

27. The computer program for manufacturing a customized item from claim 26, wherein the code segment for mapping the personalization text further comprises a code segment for obtaining a set of configuration parameters from a database.

28. The computer program for manufacturing a customized item from claim 27, wherein the set of configuration parameters comprise:

a font name parameter, a character spacing parameter, a character thickness parameter, a character type parameter, an upper boundary curve parameter, and lower boundary curve parameter.

29. The computer program for manufacturing a customized item from claim 23, wherein the code segment for converting the geometric model into a set of machining instructions comprises:

a code segment for obtaining a plurality of machining patterns and associated cutting tools;

a code segment for generating a first set of curves that define a first two dimensional toolpath based on cutter geometry for a first machining pattern from the plurality of machining patterns;

a code segment for projecting the first two dimensional toolpath onto a surface of the customized item to generate a first three dimensional toolpath;

a code segment for rotating the first three dimensional toolpath by a first angle associated with the surface of the customized item to obtain a first resulting toolpath;

a code segment for repeating the use of the code segment for generating, the code segment for projecting and the code segment for rotating a process a second machining pattern from the plurality of machining patterns, to obtain a second resulting toolpath;

a code segment for converting coordinates from the master toolpath to a generic format file.

30. The computer program for manufacturing a customized item from claim 29, wherein the machining pattern is chosen from the group comprising:

a raster pattern, wherein Voronoi diagram techniques are used to generate two dimensional offsets defined by text geometry, cutting tool shape, and cutting depth;

a profile pattern, wherein Voronoi diagram techniques are used to generate two dimensional offsets defined by text geometry, cutting tool shape, and cutting depth;

a skeleton pattern, wherein Voronoi diagram techniques are used to generate medial axis transforms defined by text geometry, cutting tool shape, and cutting depth;

a light skeleton pattern, wherein Voronoi diagram techniques are used to generate medial axis transforms defined by text geometry, cutting tool shape, and cutting depth;

a two dimensional curve machining with surface projection pattern; and a three dimensional curve machining pattern.

31. The computer program for manufacturing a customized item from claim 29, further comprising a code segment for reformatting the generic format file to a mill-specific file format.

32. The computer program for manufacturing a customized item from claim 23, wherein the code segment for constructing, the code segment for scaling, the code segment for projecting and the code segment for converting are executed on demand when new order data is received.

33. The computer program for manufacturing a customized item from claim 23, wherein the cutter geometry is tapered or cylindrical.

34. A method for manufacturing a customized item, comprising:

receiving order data, where the order data specifies a first personalization element;

constructing a geometric model for the customized item, wherein constructing a geometric model comprises at least one of:

retrieving one or more stock or icon panels from a repository; and assembling one or more text panels for a personalization text in a specified font, wherein the step of assembling one or more text panels comprises:

retrieving the personalization text and a design number from the order data;

receiving font information for the specified font;

requesting and receiving font geometry from an operating system;

constructing a plurality of splines from the font geometry;

mapping the personalization text onto a two dimensional frame using the font geometry;

tessellating the plurality of splines for generating a polyline data representation, wherein the polyline data representation comprises a plurality of polyline sets, wherein each of the polyline sets describes a character of the personalization text;

processing each of the polyline sets based on kerning data for properly spacing each character of the personalization text; and mapping the polyline data representation between two boundary curves;

scaling the first personalization element to proper size;

projecting the first personalization element onto a three dimensional surface of the geometric model; and converting the geometric model into a set of machinery instructions for a milling machine compensating for cutter geometry.

* * * * *

UNITED STATES PATENT AND TRADEMARK OFFICE

CERTIFICATE OF CORRECTION

PATENT NO. : 7,069,108 B2

APPLICATION NO. : 10/315475

DATED : June 27, 2006

INVENTOR(S) : Timothy D. Saarela et al.

It is certified that error appears in the above-identified patent and that said Letters Patent is hereby corrected as shown below:

| Col. | Line | PTO | Should Read |
|---|---|---|---|
| 3 | 36 | " shows they system " | -- shows the system -- |
| 10 | 39 | " the system fro " | -- the system for -- |
| 10 | 40 | " wherein the a construction " | -- wherein the construction -- |

Signed and Sealed this

Sixth Day of February, 2007

JON W. DUDAS

*Director of the United States Patent and Trademark Office*